United States Patent
Xiao et al.

(10) Patent No.: US 10,671,385 B2
(45) Date of Patent: Jun. 2, 2020

(54) DYNAMIC CODE MATURITY DETERMINATION FOR PROACTIVE CODE REVIEW AND MERGE

(71) Applicant: INTERNATIONAL BUSINESS MACHINES CORPORATION, Armonk, NY (US)

(72) Inventors: Ping Xiao, Beijing (CN); Su Liu, Austin, TX (US); Si Bin Fan, Beijing (CN); Meng Wan, Beijing (CN); Xue Yong Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/960,610

(22) Filed: Apr. 24, 2018

(65) Prior Publication Data
US 2019/0324742 A1    Oct. 24, 2019

(51) Int. Cl.
*G06F 8/71* (2018.01)
*G06N 20/00* (2019.01)

(52) U.S. Cl.
CPC .............. *G06F 8/71* (2013.01); *G06N 20/00* (2019.01)

(58) Field of Classification Search
CPC .................................. G06F 8/71; G06N 20/00
USPC .................................................. 717/120–167
See application file for complete search history.

(56) References Cited

U.S. PATENT DOCUMENTS

| | | | | |
|---|---|---|---|---|
| 6,928,637 B2 * | 8/2005 | Leherbauer | ............... | G06F 8/71 717/122 |
| 7,856,621 B2 * | 12/2010 | Plante | ....................... | G06F 8/71 717/104 |
| 8,122,443 B2 * | 2/2012 | Letkeman | ................. | G06F 8/71 717/104 |
| 8,407,670 B2 | 3/2013 | Hegde et al. | | |

(Continued)

FOREIGN PATENT DOCUMENTS

| | | |
|---|---|---|
| CN | 106406918 A | 2/2017 |
| WO | 2017044352 A1 | 3/2017 |

OTHER PUBLICATIONS

Noy, Natalya F., and Mark A. Musen. "Ontology versioning in an ontology management frannework." IEEE Intelligent Systems 19.4 (2004): pp. 6-13. (Year: 2004).*

(Continued)

*Primary Examiner* — Satish Rampuria
(74) *Attorney, Agent, or Firm* — Cantor Colburn LLP; Noah Sharkan

(57) ABSTRACT

A computer-implemented method includes detecting a first user is editing a first version of a content piece. A first feature set value is determined, describing a first set of values of one or more features of the first version. Based on the first feature set value, a first maturity score of the first version is determined, using a mapping. It is detected that a second user is editing a second version of the content piece in parallel with the first user editing the first version. A second feature set value is determined, describing a second set of values of the one or more features of the second version of the content piece. Based on the second feature set value, a second maturity score of the second version is determined, using the mapping. It is detected that the second maturity score meets a maturity threshold. Thus, a remedial action is performed.

17 Claims, 8 Drawing Sheets

(56) References Cited

U.S. PATENT DOCUMENTS

| | | | |
|---|---|---|---|
| 8,533,668 B2 | 9/2013 | De Oliveira Costa | |
| 8,635,592 B1* | 1/2014 | Bodman | G06F 8/38 717/106 |
| 8,826,222 B2 | 9/2014 | Bak et al. | |
| 8,949,769 B2 | 2/2015 | Biehl et al. | |
| 9,128,805 B2 | 9/2015 | Michaely et al. | |
| 9,436,460 B2 | 9/2016 | Bantupalli | |
| 9,454,459 B2 | 9/2016 | Bigwood et al. | |
| 9,639,349 B2 | 5/2017 | Wang et al. | |
| 2003/0046441 A1* | 3/2003 | Rau | G06F 8/71 719/315 |
| 2007/0011654 A1* | 1/2007 | Opperman | G06F 8/70 717/122 |
| 2008/0209387 A1 | 8/2008 | Biehl et al. | |
| 2011/0265063 A1 | 10/2011 | De Oliveira Costa | |
| 2013/0036400 A1* | 2/2013 | Bak | G06F 8/71 717/101 |
| 2013/0080350 A1 | 3/2013 | Bhola et al. | |
| 2015/0040101 A1 | 2/2015 | Rummler et al. | |

OTHER PUBLICATIONS

Canfora, Gerardo, and Luigi Cerulo. "Impact analysis by mining software and change request repositories." 11th IEEE International Software Metrics Symposium (METRICS'05). IEEE, 2005.pp. 1-9 (Year: 2005).*

Jegathambal, P. M. G., and P. Sheela Gowr. "An Efficient Approach for Requirement Traceability Integrated With Software Repository." pp. 65-71 (Year: 2013).*

Bang et al., "Continuous Analysis of Collaborative Design," Software Architecture (ICSA), 2017 IEEE International Conference, DOI: 10.1109/ICSA.2017.45, Apr. 3-7, 2017, pp. 1-3.

Motherudin et al., "A Proposed Model for Code Quality Maturity Model," Journal of Software, doi: 10.17706/sw.10.3.374-383, Sep. 12, 2014, pp. 1-10.

OPENCOG "Code Maturity Guide", retrieved from https://wiki.opencog.org/w/Code_Maturity_Guide on Dec. 20, 2019; 5 pgs.

Wikipedia "Merge (version control)", retrieved from https://en.wikipedia.org/wiki/Merge_(version_control); downloaded Dec. 20, 2019, 6 pgs.

* cited by examiner

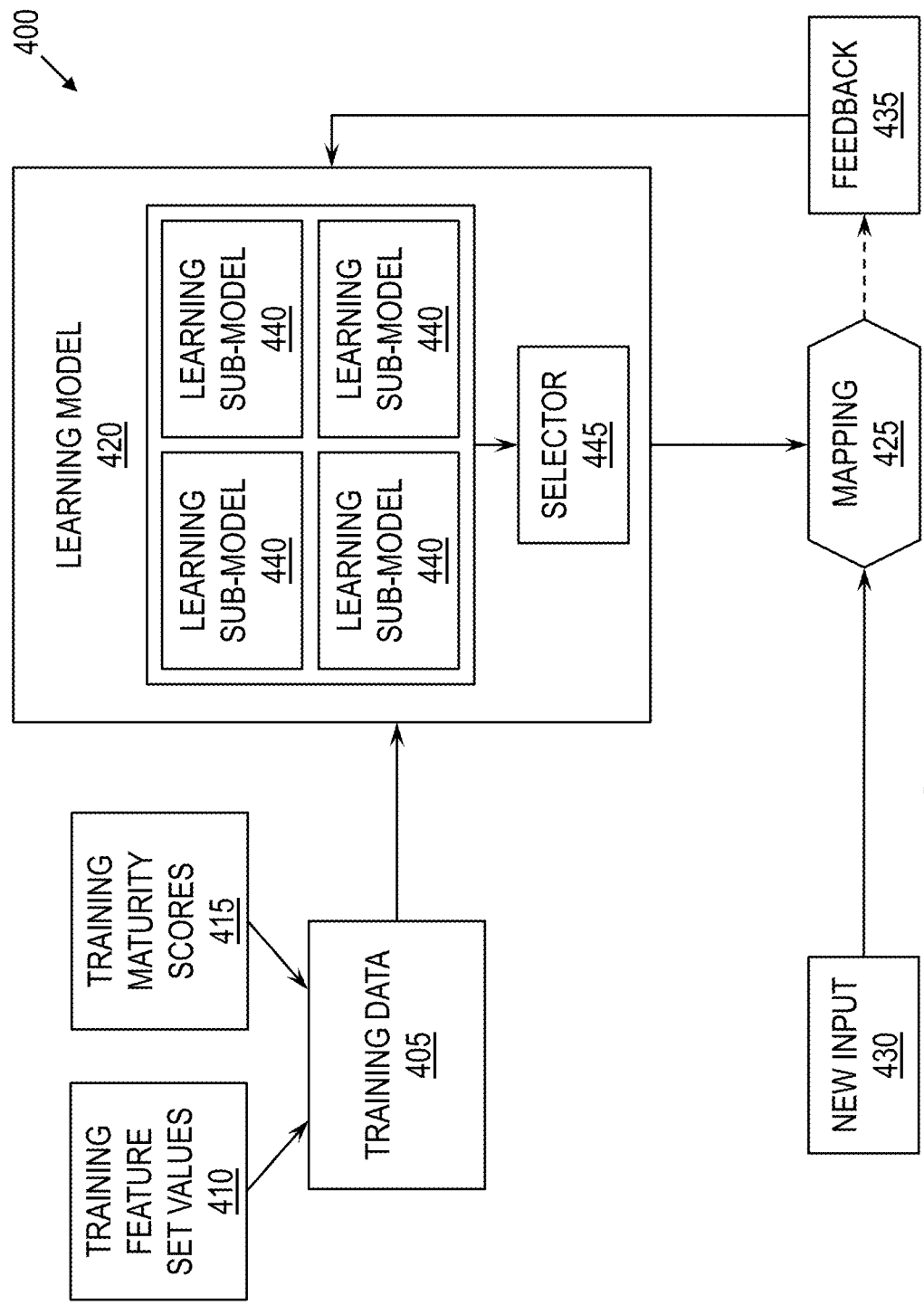

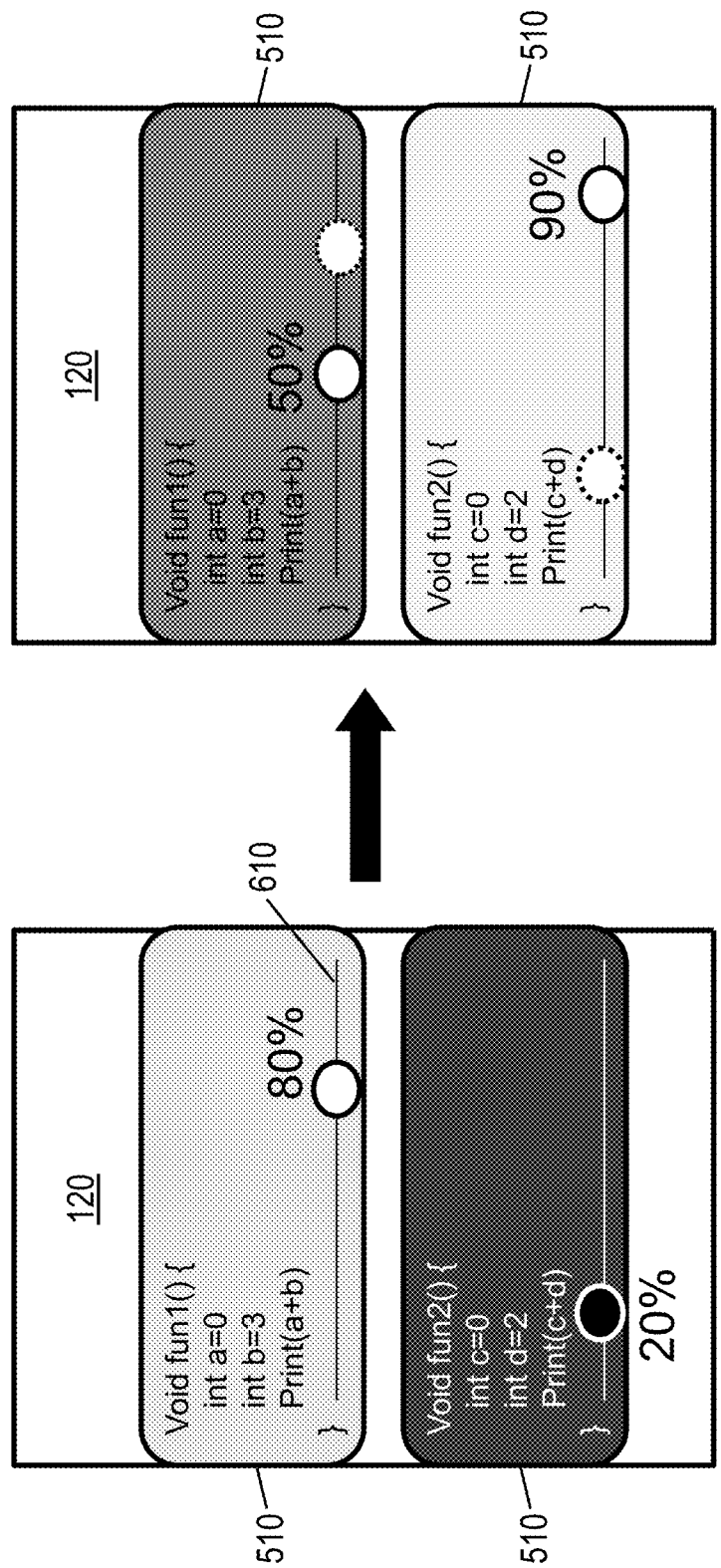

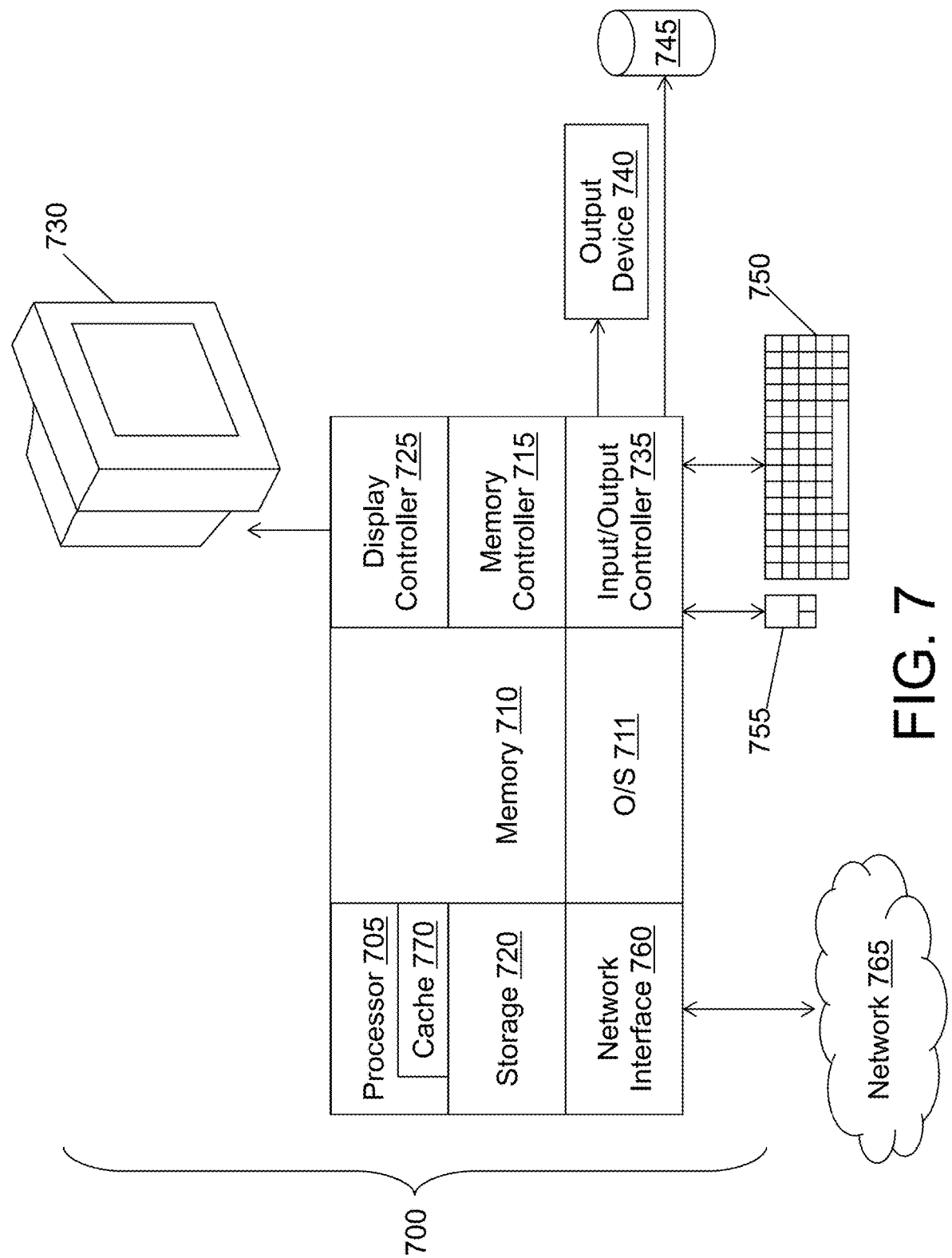

DYNAMIC CODE MATURITY DETERMINATION FOR PROACTIVE CODE REVIEW AND MERGE

BACKGROUND

The present invention relates to code development and, more specifically, to dynamic code maturity determination for proactive code review and merge.

Code merge, or code integration, is an operation for reconciling changes to a version-controlled collection of files. For example, those files may contain program code. Code merge is helpful when a file is modified in parallel on two or more distinct branches. During code merge, two or more files are sought to be reconciled, where both files have been changed from a single previous version. However, it may not be immediately clear which changes to accept from one file and which to accept from another file, particularly when portions of the changes are in direct conflict.

SUMMARY

Embodiments of the present invention are directed to a computer-implemented method for dynamic code maturity determination. A non-limiting example of the computer-implemented method includes detecting that a first user is editing a first version of a content piece. A first feature set value is determined, describing a first set of values of one or more features of the first version of the content piece. Based on the first feature set value, a first maturity score of the first version of the content piece is determined, by using a mapping. It is detected that a second user is editing a second version of the content piece in parallel with the first user editing the first version of the content piece. A second feature set value is determined, describing a second set of values of the one or more features of the second version of the content piece. Based on the second feature set value, a second maturity score of the second version of the content piece is determined, by using the mapping. It is detected that the second maturity score meets a maturity threshold. A remedial action is performed, based at least in part on the second maturity score reaching the maturity threshold, and based at least in part on the second user editing the second version of the content piece in parallel with the first user editing the first version of the content piece.

Embodiments of the present invention are directed to a system for dynamic code maturity determination. A non-limiting example of the system includes a memory having computer-readable instructions and one or more processors for executing the computer-readable instructions. The computer-readable instructions include detecting that a first user is editing a first version of a content piece. Further according to the computer-readable instructions, a first feature set value is determined, describing a first set of values of one or more features of the first version of the content piece. Based on the first feature set value, a first maturity score of the first version of the content piece is determined, by using a mapping. It is detected that a second user is editing a second version of the content piece in parallel with the first user editing the first version of the content piece. A second feature set value is determined, describing a second set of values of the one or more features of the second version of the content piece. Based on the second feature set value, a second maturity score of the second version of the content piece is determined, by using the mapping. It is detected that the second maturity score meets a maturity threshold. A remedial action is performed, based at least in part on the second maturity score reaching the maturity threshold, and based at least in part on the second user editing the second version of the content piece in parallel with the first user editing the first version of the content piece.

Embodiments of the invention are directed to a computer-program product for dynamic code maturity determination, the computer-program product including a computer-readable storage medium having program instructions embodied therewith. The program instructions are executable by a processor to cause the processor to perform a method. A non-limiting example of the method includes detecting that a first user is editing a first version of a content piece. Further according to the method, a first feature set value is determined, describing a first set of values of one or more features of the first version of the content piece. Based on the first feature set value, a first maturity score of the first version of the content piece is determined, by using a mapping. It is detected that a second user is editing a second version of the content piece in parallel with the first user editing the first version of the content piece. A second feature set value is determined, describing a second set of values of the one or more features of the second version of the content piece. Based on the second feature set value, a second maturity score of the second version of the content piece is determined, by using the mapping. It is detected that the second maturity score meets a maturity threshold. A remedial action is performed, based at least in part on the second maturity score reaching the maturity threshold, and based at least in part on the second user editing the second version of the content piece in parallel with the first user editing the first version of the content piece.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4B is a diagram of another high-level architecture of learning the mapping, according to some embodiments of the invention;

FIG. 6A-6B illustrate a mechanism for receiving feedback in the reconciliation system, according to some embodiments of this invention; and FIG. 7 is a block diagram of a computer system for implementing some or all aspects of the reconciliation system, according to some embodiments of this invention.

Figure 1:
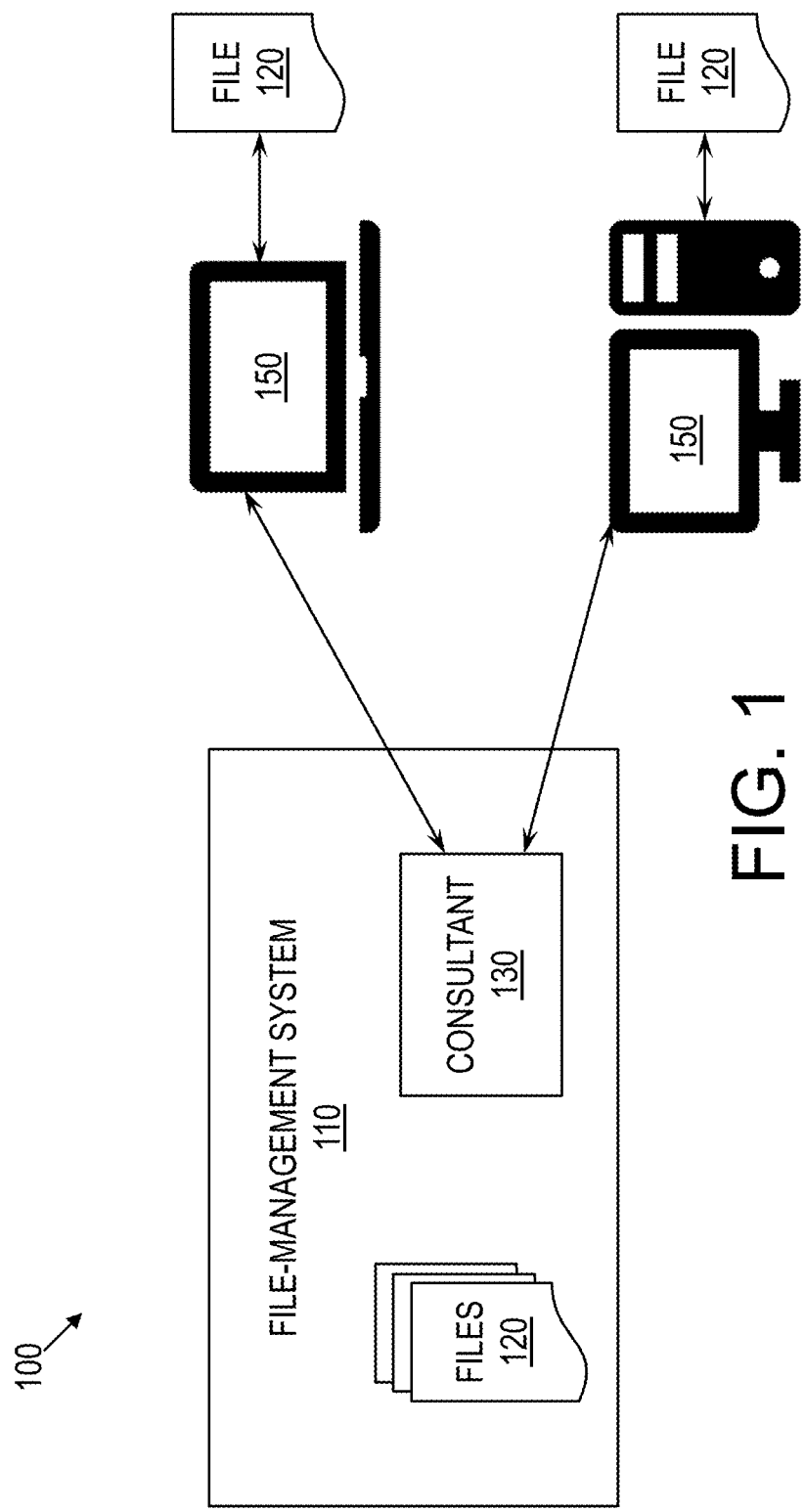
FIG. 1 is a block diagram of a reconciliation system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, some merging systems exist to merge versions of a file. However, these systems generally focus on the times at which changes were made, where the most recent changes are given priority in a conflict. As a result, for example, a recent change made to program code by an inexperienced programmer might replace a prior change made by a highly experienced programmer, when it is likely the reverse that should happen.

Turning now to an overview of the aspects of the invention, one or more embodiments of the invention address the above-described shortcomings of the prior art by providing assistance with version reconciliation by determining a level of maturity of content, where that content may be program code. In some embodiments of the invention, various features of the content are mapped to a maturity score. For example, when merging code, the features considered may be programmer level, number of builds, update time, story points, code function, and number of changed lines. The maturity score may be used to proactively address potential conflicts and to enable automatic merging that is performed more strategically than in many existing merging systems.

The above-described aspects of the invention address the shortcomings of the prior art by considering various factors when determining how to reconcile conflicting changes to a file, rather than addressing conflicts solely based on revision time. Further, some embodiments of the invention proactively issue alerts or proactively open communication channels when maturity reaches a certain threshold, thus enabling users to work together to reconcile changes and to avoid further conflicts.

Turning now to a more detailed description of aspects of the present invention, FIG. 1 is a block diagram of a reconciliation system 100 according to some embodiments of this invention. As shown in FIG. 1, the reconciliation system 100 may include, or may be integrated with, a file-management system 110. The file-management system 110 may manage versions of one or more files 120. The files 120 managed by the file-management system 110 may include code, text, media, or other content. The file-management system 110 may enable users to check out versions of files 120, which may then be edited on local computers 150 of those users. In same cases, multiple users may check out a single file 120 and may thus edit that file 120 in parallel.

A consultant 130 may be in communication with the file-management system 110 and, in some embodiments of the invention, is integrated with the file-management system 110. The consultant 130 may have access to files 120 that are checked out of the file-management system 110 and thus may be capable of viewing edits in real time or close to real time. For example, and not by way of limitation, the consultant 130 may include a software agent that runs in the background of a local computer 150 as a file 120 is being edited. The consultant 130 may proactively review edits to files 120 to reduce potential conflicts, and the consultant 130 may facilitate the merging of distinct versions of files 120. As needed, the consultant 130 may open a communication channel between users to enable collaborative work and thereby avoid potential conflicts. To this end, as described in detail below, the consultant 130 may proactively determine maturity scores of content pieces in the files 120 managed by the file-management system 110.

Each file 120 managed by the file-management system 110 may include one or more pieces of content or content pieces. The boundaries of each content piece within a file 120 may be defined in various ways. For example, and not by way of limitation, empty lines or line breaks may separate content pieces within a single file 120. In the case of program code, where the content pieces are pieces of code, or code pieces, braces or other bounding characters may be interpreted as separators. Further, each method or class may be considered a different piece of content. In some embodiments of the invention, the boundaries of content pieces may be implicitly defined by those who are writing or editing a file 120 containing those content pieces. For instance, the consultant 130 may detect the beginning and the end of a portion of a file 120 being edited, based on the first and last line numbers touched, and that edited portion may be viewed as a single content piece.

The consultant 130 may determine a mapping from features of content pieces to maturity scores. In some embodiments of the invention, the mapping is learned based on known content pieces associated with known maturity scores. Thus, upon analyzing a content piece, the consultant 130 may assign a maturity score to that content piece based on the mapping as applied to features of the content piece. Based on the maturity score, the consultant may proactively review content, issue alerts, or merge versions of the content piece.

It will be understood that, although this disclosure refers repeatedly to code and code pieces, the reconciliation system 100 is not limited to code. Rather, the content pieces being reconciled may be text, media, or other content. In that case, the features considered to determine the maturity scores may be based on considerations related to the type of content being merged.

The file-management system 110 and the consultant 130 may each be made up of hardware, software, or a combination of both. For example, each may be software or each may be a dedicated hardware circuit.

Figure 2:
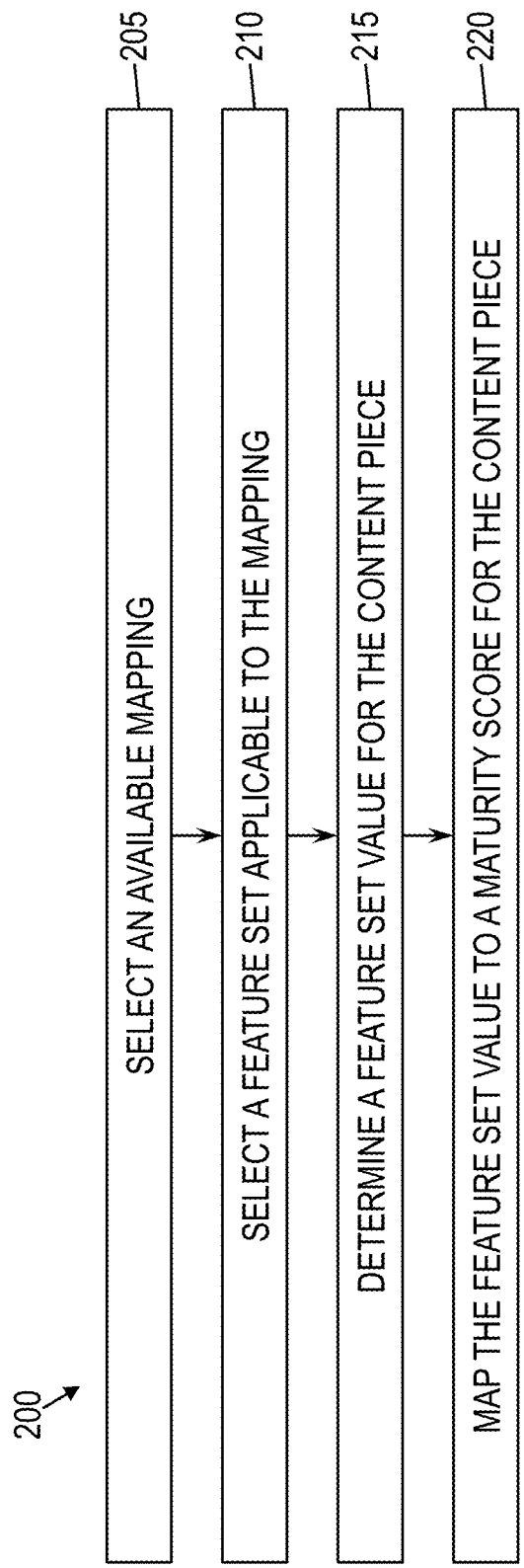
FIG. 2 is a flow diagram of a method for assigning a maturity score to a code piece, according to some embodiments of the invention.

FIG. 2 is a flow diagram of a method 200 for assigning a maturity score to a content piece, such as a code piece, according to some embodiments of this invention. In some embodiments of the invention, this method 200 is performed by the consultant 130. Assignment of a maturity score may refer to initial assignment or to updating an existing maturity score. This method 200 may be initiated responsive to various activities related to the content piece. For example, and not by way of limitation, when the content piece is checked into the file-management system 110 after editing (e.g., when the file 120 containing the content piece is checked in), then the consultant 130 may automatically assign a maturity score to the content piece. For another example, the consultant 130 may assign a maturity score to a content piece each time the content piece is saved (e.g., each time the corresponding file is saved) or periodically while the content piece is checked out for editing (e.g., while the corresponding file 120 is checked out).

As shown in FIG. 2, at block 205, an available mapping may be selected. One or more mappings of feature sets to maturity scores may be maintained by the reconciliation system 100, such as by the consultant 130. Each mapping may be applicable to a type of content. A mechanism for determining a mapping will be described further below. If more than a single mapping is maintained by the reconciliation system 100, then one of such mappings may be selected based on the content type of the content piece for which a maturity score is sought.

At block 210, a feature set may be selected for the content piece. Specifically, the reconciliation system 100 may determine which features are required for the mapping that was selected.

A feature set may be a set of one or more features or characteristics. The feature set may have been previously determined by the mapping, which may be based on the type of content being analyzed and scored. In some embodiments of the invention, when the content is a code piece, possible features may include one or more of the following: programmer level, number of builds, number of update times, story points, code function, and number of lines. For example, and not by way of limitation, the feature set may include all of these features.

For each file 120, the file-management system 110 may maintain a record, such as metadata, for each file 120. The record may include feature values describing the content pieces in the file 120, where each feature value is the value of a corresponding feature. If the various files 120 of the file-management system 110 include various types of content, then the features for which values are stored for a particular file 120 may be based on content types associated with that file 120. In other words, for example, the features for which values are stored for one file 120 may differ from the features for which values are stored for another file 120, based on the content types of those files 120.

Further, the associated record of a file 120 may include a distinct set of feature values for each content piece deemed to exist in the file 120. For a code piece, for example, the record associated with the containing file 120 may include the number times the code piece was built, the number of times the code piece was updated, the number of story points in the code piece, a code function area, and the number of lines in the code piece.

The code function area of a code piece may be a categorization, or classification, of that code piece. This categorization may be used, for example, to classify code pieces by function or purpose. In some embodiments of the invention, the value of this feature may be a string selected from a predetermined set of possible code function areas. For example, and not by way of limitation, the code function area may be selected from one of the following strings: "communication," "file," "security," and "configuration." It will be understood that the possible code function areas may vary based on design goals of the various code pieces.

In some embodiments of the invention, each user enabled to access files 120 through the file-management system 110 has an account with the file-management system 110. Through that account, the user may check out and modify files 120, and thus content pieces, managed by the file-management system 110. Because the file-management system 110 may maintain records of who has checked out and modified files, the file-management system 110 may know which users modified each file and when. Further, the file-management system 110 may associate each user with a programmer level. As a result, due to knowing the users that have modified each content piece, the reconciliation system 100 may also know the programmer levels of users who have modified each content piece. If multiple users have edited a code piece, then the determination of a value for the programmer level of the code piece may be based on a pre-established algorithm. For example, and not by way of limitation, the programmer level of a code piece may be the programmer level of the most recent editing user, or the programmer level may be the average programmer level of all the users who have edited the code piece.

As is well-known in the art, the number of story points is a measure of code complexity. It will be understood that a different measure of complexity may be used in place of, or in addition to, story points.

Feature values of content pieces may be updated within the file-management system 110 as each content piece is checked out, modified, and checked in. For example, and not by way of limitation, the consultant 130 may track changes to checked-out files 120 in real time and, as a result, may update feature values of content pieces in those files 120 in real time. Alternatively, for another example, the consultant 130 may automatically compare files 120, upon check in, to versions that were checked out. As such, changes to each content piece in a file 120 may be determined, and the feature values associated with each content piece may be updated.

At block 215, a value may be determined for each feature in the feature set. In other words, a feature set value may be determined for the content piece. Because the file-management system 110 may maintain feature values, determination of the feature set value may require only extracting from the file-management system 110 the feature values corresponding to the feature set.

At block 220, the feature set value of the content piece may be mapped to a maturity score, based on the mapping that was previously determined. Because editing and thus feature set values may be tracked in real time, the maturity score of the content piece may be updated dynamically as edits are detected. In other words, maturity scores may be updated in real time while a content piece is being edited.

As will be described in more detail below, the resulting maturity score of the content piece may be used by the consultant 130. Further, determination of the mapping itself is described in detail below, with reference to FIGS. 3-4B.

Figure 3:
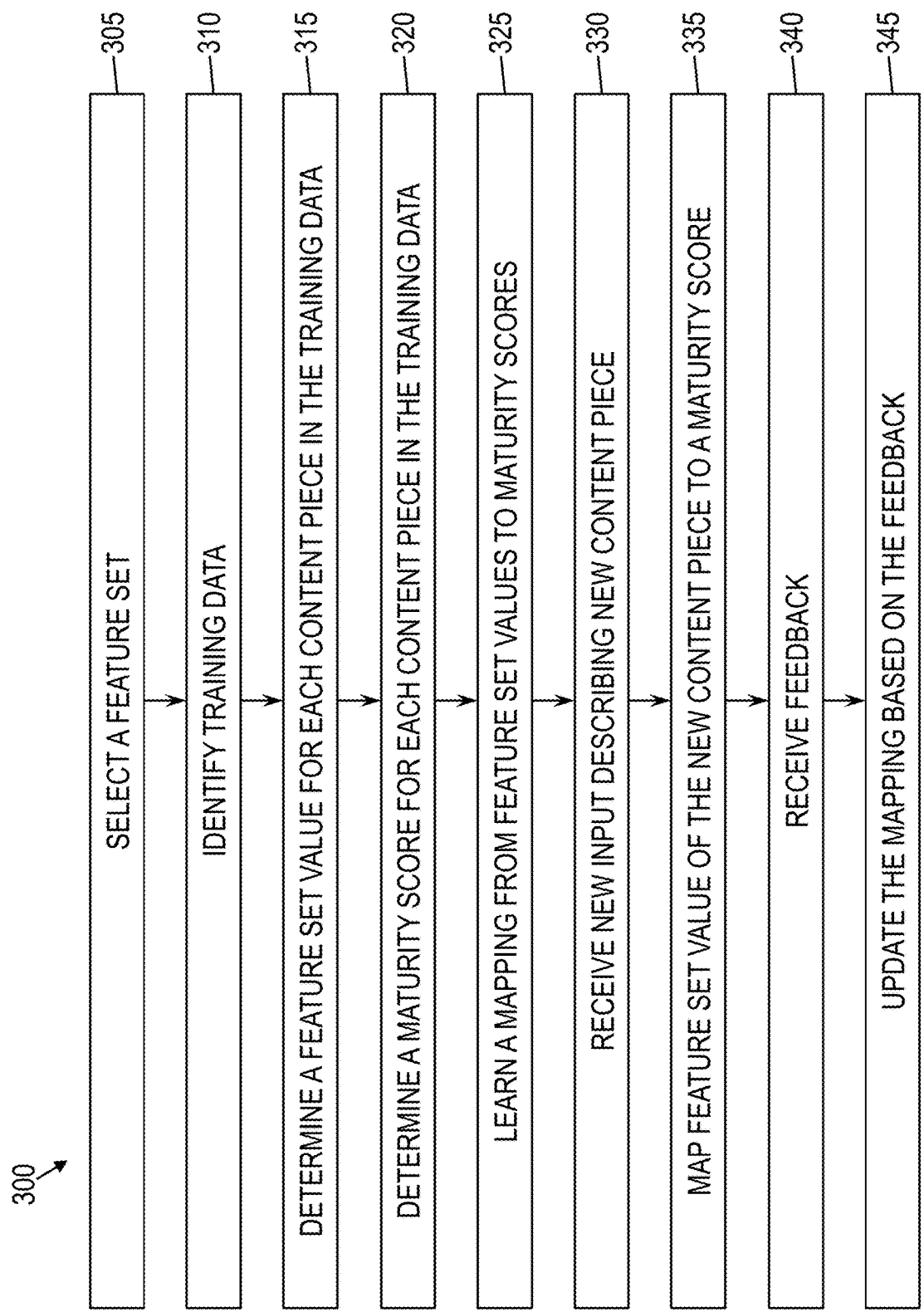
FIG. 3 is the method of learning a mapping from feature sets to maturity scores, according to some embodiments of the invention.

FIG. 3 is a method 300 of learning a mapping from feature sets to maturity scores, according to some embodiments of the invention. The mapping need not be a one-to-one mapping. Rather, each feature set value may map to a single maturity score, but a maturity score may be mapped to by one or more feature set values, or by no feature set values. In some embodiments of the invention, the file-management system 110 manages files of only a single content type for which maturity scores are sought, and in that case, only one mapping need be determined. However, if multiple content types exist in the files 120 being managed, and if it is desirable to utilize reconciliation features of the reconciliation system 100 for more than one content type, then more than a single mapping may be learned, or a single mapping may be learned to handle multiple content types.

As shown in FIG. 3, at block 305, a feature set may be selected. The feature set may be set of features being considered for the mapping, where the feature set is selected from features maintained by the file-management system 110. If the mapping is specific to a particular content type, the feature set may be selected from features for which values are tracked for that content type. For example, if the mapping is for photographic content, then programmer level need not be tracked for the content pieces in question, and thus programmer level would not be selected as part of the feature set. In some embodiments of the invention, all features being tracked for the applicable content type may be selected for inclusion in the feature set. If the mapping is applicable to multiple content types, then in some embodiments of the invention, all features being tracked may be selected for inclusion.

At block 310, training data may be identified. The training data may include a plurality of content pieces and their associated features. These content pieces may match the content type of the mapping being learned and are referred to herein as training content pieces. For example, and not by way of limitation, the training content pieces may make up delivered projects, where each delivered project is a set of content pieces that together fulfill a purpose. For example, and not by way of limitation, a delivered project may be a completed software package made up of one or more code pieces, which act as training content pieces.

At block 315, a feature set value may be determined for each content piece in the training data. The feature set values of the training data are referred to herein as training feature set values. For each training content piece, the training feature set value may be determined by extracting feature values of the training content piece from the file-management system 110. In other words, for each feature in the feature set, the feature value of a content piece may be extracted from the file-management system 110 and included in the feature set value of the content piece.

At block 320, a maturity score may be determined for each content piece in the training data. The maturity scores of the training data are referred to herein as training maturity scores. The training maturity scores may be established manually, automatically, or a combination of both. For example, and not by way of limitation, each training content piece that is completed, or delivered, the code may be automatically assigned a maximum maturity score. The value of the maximum maturity score may vary between embodiments of the invention. For example, that maximum maturity score may be 100, 10, 1, or 100%. Further, in some embodiments of the invention, the training data includes various subsets of training content pieces, where each subset represents a delivered project at varying points in time. For example, one subset may include a delivered version of code piece, a second version of the same code piece as it existed a month before delivery, and a third version of the same code piece as it existed six months before delivery. Because a timeline for delivering the code piece is known, the maturity scores for each of these versions, which are used as training content pieces, may be established automatically or manually. For example, and not by way of limitation, to automatically establish the maturity scores for such a subset, it may be assumed that the maturity score for the code piece increased linearly over time, or according to some other function over time. Thus, with knowledge of when the code piece was first created and when it was delivered, the maturity score at each point in time between those two points may be established through interpolation. It will be understood that various other methodologies may be used to establish maturity scores automatically. The maturity score for each content piece may be added to the training data and associated with the respective content piece.

At block 325, a learning model may be used to determine the mapping. The learning model may utilize a set of variables as follows: $M=\{m_1, m_2, \ldots m_v\}$ are the set of possible maturity scores. For example, where a maturity score is an integer between 1 and 100 inclusive, $M=\{m_1=1, m_2, 2, \ldots m_{100}=100\}$. Where x is the number of features in the feature set, a feature set value $F=\{f_1, f_2, \ldots f_x\}$.

In an example naïve Bayes model, $P(m_j)$ is the count of content pieces in the training data 405 assigned a maturity score of $m_j$ divided the total number of content pieces in the training data 405. In other words, $P(f_i|m_j)$ represents the statistical probability of $m_j$ appearing in the training data 405. $P(f_i|m_j)$ is the count of content pieces in the training data 405 having the feature $f_i$ and also assigned the maturity score $m_j$, divided by the total count of content pieces in the training data 405 having a maturity score of $m_j$. $P(m_j, \{f_1, f_2, \ldots f_x\}) = P(m_j) \times P(f_1|m_j) \times P(f_2|m_j) \times \ldots \times P(f_x|m_j)$. Thus, in this example learning model, the resulting mapping maps the maturity score of a code piece with feature set $F=\{f_1, f_2, \ldots f_x\}$ to $\arg\max_i\{P(m_i, \{f_1, f_2, \ldots f_x\})\}$, which is the $m_i$ that maximizes the value of $P(m_i, \{f_1, f_2, \ldots f_x\})$.

In some embodiments of the invention, rather than using a single learning model, the reconciliation system 100 may use a combination of two or more learning models. In that case, each of such learning models may be viewed as a learning sub-model, where a selector is used to select a result from each of learning sub-models. Together, the learning sub-model and the selector may be viewed as a single learning model. This variation will be described in more detail below, with reference to FIG. 4B.

At block 330, a new input may be received, where this new input may describe a new content piece that is not part of the training data. In some embodiment of the invention, the maturity score for this new content piece is not yet known. However, because the new content piece is associated with the file-management system 110, feature values of the new content piece may be determined. At block 335, the mapping may be used to map the feature set value of the new content piece to a maturity score.

At block 340, feedback may be received regarding the success of the mapping. For example, and not by way of limitation, the reconciliation system 100 may enable users to adjust maturity scores, as will be described in more detail below, with reference to FIGS. 6A-6B. Such an adjustment may be taken as feedback. At block 345, this feedback may be inputted into the learning model to update the learning model and resulting mapping. Specifically, for example, the new content piece and its feature set value and adjusted maturity score may be added to the training data. The mapping may be updated according to the resulting updated training data, which includes the new content piece and adjusted maturity score.

Figure 4A:
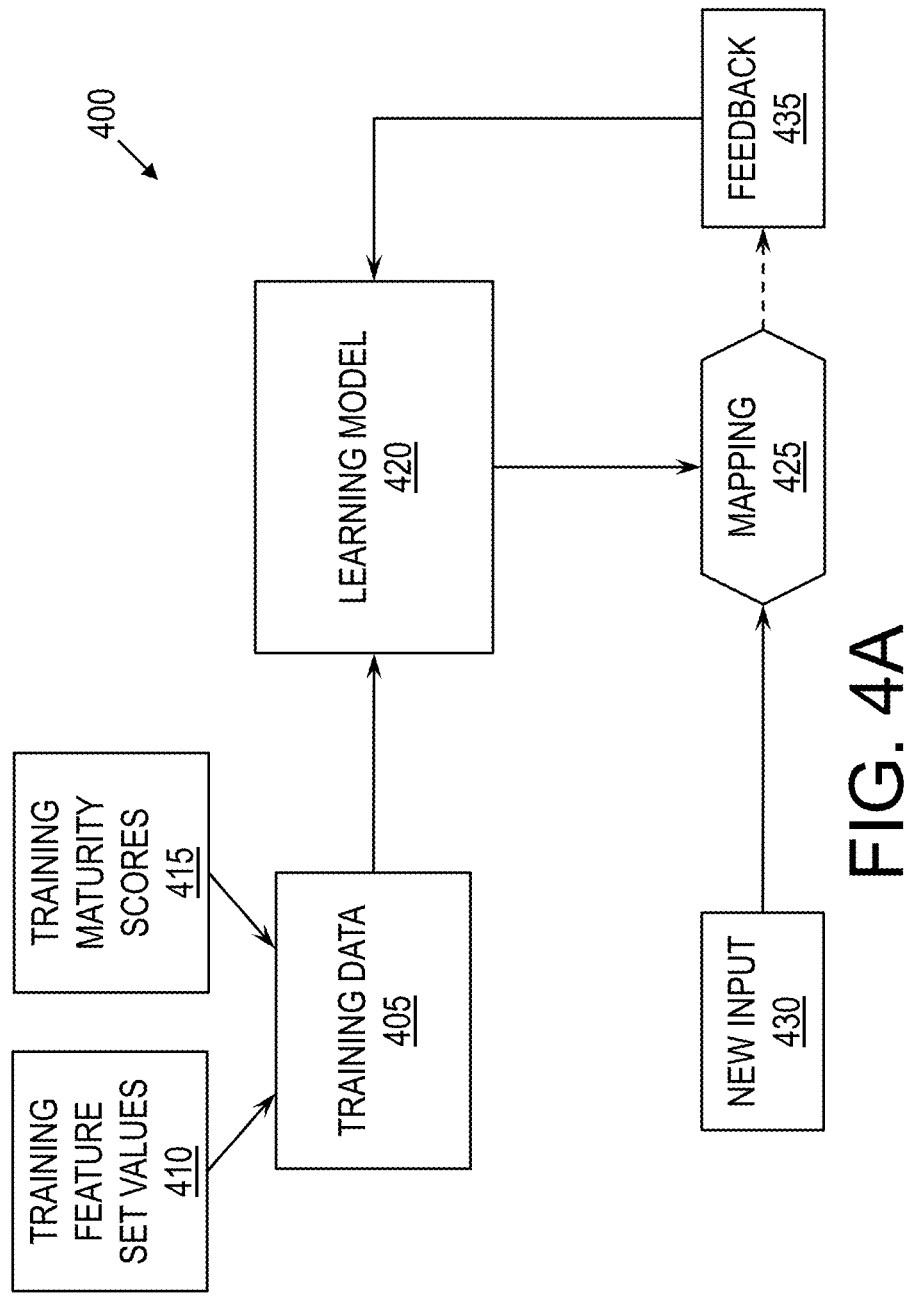
FIG. 4A is a diagram of a high-level architecture of learning the mapping, according to some embodiments of the invention.

FIG. 4A is a diagram of a high-level architecture of learning the mapping 425 in the reconciliation system 100, according to some embodiments of the invention. As shown in FIG. 4, the training data 405 includes training feature set values 410 and training maturity scores 415. A learning model 420 takes this training data 405 as input, and the learning model 420 outputs the mapping 425 of the feature set values to maturity scores. Occasionally, new input 430 may be introduced, such as when a content piece is updated in the file-management system 110. The resulting updated content piece may be deemed new input 430 with the respect to the mapping 425 because the feature set values of the content piece have changed with the update. The new content piece may be mapped to a maturity score, based on the mapping 425. When feedback 435 is received, such as an adjustment to the maturity score of the new content piece, that feedback 435 may be inputted back into the learning model 420, thereby updating the mapping 425.

FIG. 4B illustrates another architecture 400 of learning the mapping 425 in the reconciliation system 100, according to some embodiments of the invention. As shown in FIG. 4B, the learning model 420 may be replaced by two or more learning sub-models 440 and a selector 445. For example, and not by way of limitation, these learning sub-models may be Kernel Support Vector Machine (SVM), Random Forest, Neural Network, and Gradient, each of which are known learning models. The selector 445 may work in various ways. For example, and not by way of limitation, the selector 445 may select a median or mean maturity score of the maturity scores calculated by the learning sub-models 440. As a result, the reconciliation system 100 may benefit from an improved learning model 420 that takes advantage of multiple learning sub-models 440.

As mentioned above, various events may prompt assigning a maturity score to a content piece. For example, and not by way of limitation, when a file 120 is opened, the one or more content pieces in that file 120 may be assigned maturity scores, or may already be associated with maturity scores.

Figure 5:
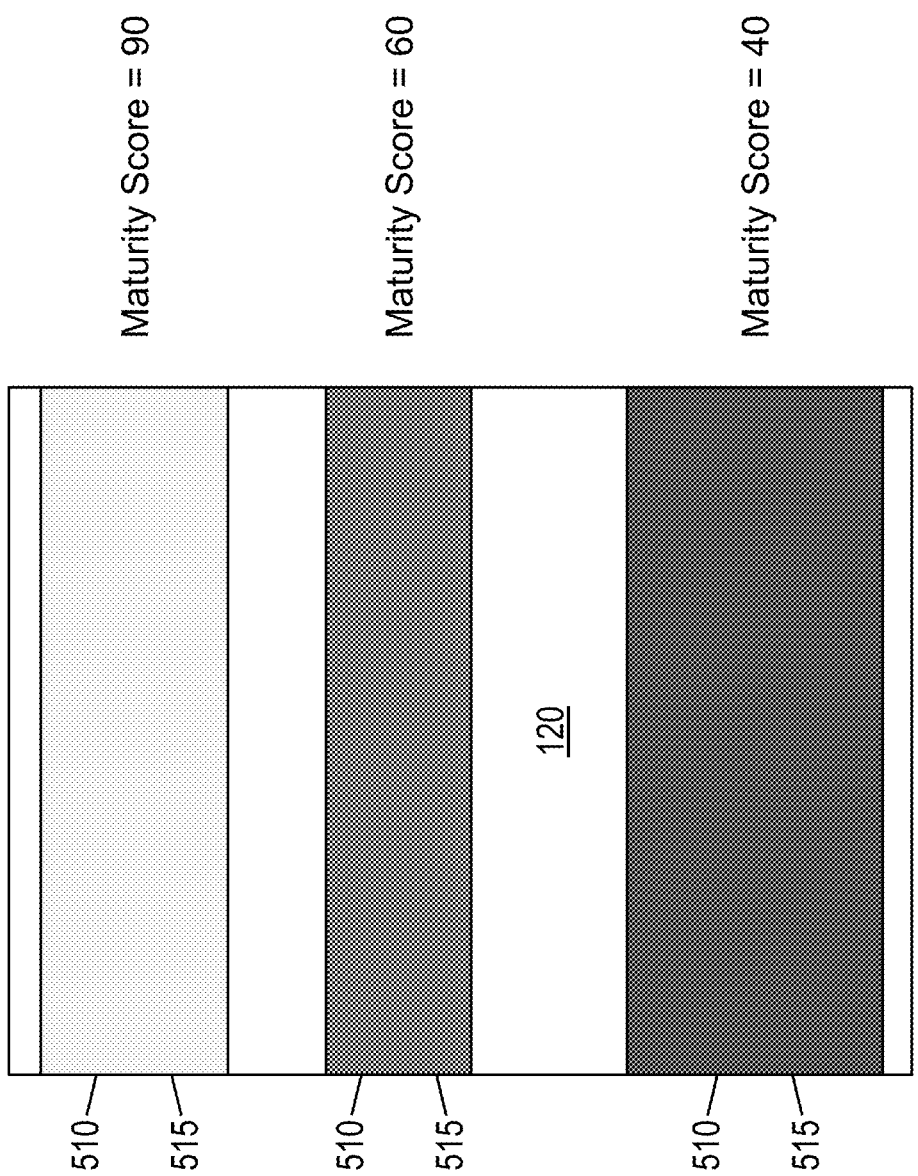
FIG. 5 illustrates a mechanism for indicating maturity scores in a file, according to some embodiments of the invention.

FIG. 5 illustrates a mechanism for indicating maturity scores in a file 120, according to some embodiments of this invention. A file 120 may have one or more content pieces 510, such as code pieces 515, and thus may be associated with one or more maturity scores, each corresponding to a respective content piece 510. In some embodiments of the invention, each possible maturity score may be associated with an indication, which may be displayed in association with the file 120 upon display of the file's contents. FIG. 5 is an example of such, where each possible maturity score is associated with a color, such as a shade of gray. In some embodiments of the invention, in the workspace of a user, a content piece 510 is tagged with the color associated with the maturity score of the content piece 510. In this example, maturity scores range from 1 to 100, and the associated colors range from black to white, where lighter shades are associated with higher maturity scores. In the example of FIG. 5, the background of each content piece 510 is displayed in the color associated with the maturity score of that content piece 510. The foreground text color of each content piece 510 may be changed to provide appropriate contrast with the background color as needed. In FIG. 5, three content pieces 510 are shown, having maturity scores of 90, 60, and 40 respectively, top to bottom. In some embodiments of the invention, the reconciliation system 100 displays the file 120 in this manner, with the maturity score of each content piece 510 indicated within the file 120.

FIG. 6A-6B illustrate a mechanism for receiving feedback 435 in the reconciliation system 100, according to some embodiments of this invention. In FIG. 6A, a file 120 is shown with two content pieces 510. The reconciliation system, specifically the consultant 130, for example, may enable a user to adjust the maturity score of each content piece 510. For example, and not by way of limitation, the user may indicate a desire to update the maturity score of a content piece 510, such as by selecting the content piece 510. Responsive to this indication, the reconciliation system 100 may display a slider 610 or other mechanism, such as a drop-down box, enabling the user to change the maturity score. In FIG. 6A, the maturity score of a first content piece 510 shown is 80, and the maturity score of a second content piece 510 shown in 20. FIG. 6B illustrates a result of updating these maturity scores, specifically to 50 and 90 respectively.

In some embodiments of the invention, this update to the maturity scores is received as feedback 435. Not only are the maturity scores of the respective content pieces 510 updated, but also the training data 405 may be updated to receive the feature set values and respective updated maturity scores of each content piece 510.

As discussed above, maturity scores may be used in various manners. For example, and not by way of limitation, when a content piece 510 is being edited in parallel, such that two versions of the content piece 510 simultaneously exist, each with a corresponding maturity score, the version with the higher maturity score may win if a conflict arises. This may be useful for automated merging, where a portion the version with the higher maturity score may automatically replace a corresponding portion of the version with the lower maturity score. In some embodiments of the invention, the consultant 130 may provide an alert when users are editing, in parallel, a content piece 510 that meets certain criteria related to maturity scores. For instance, the criteria may be that a maturity score of one version of the content piece 510 reaches a maturity threshold.

In some embodiments of the invention, each user is assigned a maturity threshold. For example, and not by way of limitation, the maturity threshold assigned to a user may be based on that user's experience level. A higher experience level may correspond to a lower maturity threshold.

When a content piece 510 is being edited by a first user and a second user in parallel, where each user has a respective version of the content piece 510 with a corresponding maturity score, the consultant 130 may take a remedial action with respect to the first user when the other version reaches the maturity threshold assigned to the second user. In other words, the second user has a maturity threshold, and then that maturity threshold is reached on the second user's version of the content piece 510, then a remedial action may be taken.

For example, and not by way of limitation, the remedial action may be to alert the first user. This alert may appear in the first user's workspace in which the first user's version of the content piece 510 is displayed. This alert may make the first user aware that a different version of the content piece 510 has reached a maturity threshold, and thus the other version of the content piece 510 is approaching full maturity. For another example, as the remedial action, the consultant 130 may automatically merge the two versions of the content piece 510 upon reaching the maturity threshold, with conflicts being solved in favor of the version that has reached the maturity threshold of its user. In some embodiments of the invention, the consultant 130 may provide a merging suggestion or prompt before performing such a merge in the second user's favor, thus giving the first user the opportunity to make changes or decline. For another example, the consultant 130 may automatically open a communication channel, enabling the first user and the second user to collaborate as they work. The communication channel may be opened, for example, by automatically placing a phone call between the two users, by automatically opening a chat application connecting the two years, or by some other mechanism.

In some embodiments of the invention, users who are more experienced, such as high-level programmers, experienced writers, or experienced editors, have lower maturity thresholds. As such, the edits of an advanced user may be given higher respect, in that the remedial action is taken in a lower-level user's workspace sooner rather than later.

FIG. 7 is a block diagram of a computer system 100 for implementing some or all aspects of the system, according to some embodiments of this invention. The reconciliation systems 100 and methods described herein may be implemented in hardware, software (e.g., firmware), or a combination thereof. In some embodiments, the methods described may be implemented, at least in part, in hardware and may be part of the microprocessor of a special- or general-purpose computer system 700, such as a personal computer, workstation, minicomputer, or mainframe computer. For example, and not by way of limitation, each of the file-management system 110 and the consultant 130 may run on, or may be, a special- or general-purpose computer system 700.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid-state drive. The stored instructions in memory 710 or in storage 720 may include those enabling the processor to execute one or more aspects of the reconciliation systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Reconciliation systems and methods according to this disclosure may be embodied, in whole or in part, in computer program products or in computer systems 700, such as that illustrated in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
    detecting that a first user is editing a first version of a content piece;
    determining a first feature set value describing a first set of values of one or more features of the first version of the content piece;
    determining, based on the first feature set value, using a mapping, a first maturity score of the first version of the content piece;
    detecting that a second user is editing a second version of the content piece in parallel with the first user editing the first version of the content piece;
    determining a second feature set value describing a second set of values of the one or more features of the second version of the content piece;
    determining, based on the second feature set value, using the mapping, a second maturity score of the second version of the content piece;
    detecting that the second maturity score meets a maturity threshold;
    performing a remedial action, based at least in part on the second maturity score reaching the maturity threshold, and based at least in part on the second user editing the second version of the content piece in parallel with the first user editing the first version of the content piece;
    associating a respective color with each possible maturity score, wherein the first maturity score is associated with a first color; and
    tagging the first version of the content piece with the first color to indicate the first maturity score to the first user.

2. The computer-implemented method of claim 1, wherein the remedial action comprises:
    merging the first version of the content piece with the second version of the content piece;
    wherein the merging creates a conflict, and wherein the second version of the content piece wins the conflict based on the second maturity score meeting the maturity threshold.

3. The computer-implemented method of claim 1, wherein the remedial action comprises automatically opening a communication channel between the first user and the second user.

4. The computer-implemented method of claim 1, wherein the maturity threshold varies between users, and wherein a respective maturity threshold of the second user is based on an experience level of the second user.

5. The computer-implemented method of claim 1, further comprising:
    learning the mapping based on training data, wherein the training data comprises a plurality of content pieces and a plurality of maturity scores, and wherein each content piece is associated with a respective maturity score in the training data.

6. The computer-implemented method of claim 1, further comprising updating the first maturity score and the second maturity score in real time as the first version of the content piece and the second version of the content piece are edited.

7. A system comprising:
    a memory having computer-readable instructions; and
    one or more processors for executing the computer-readable instructions, the computer-readable instructions comprising:
        detecting that a first user is editing a first version of a content piece;
        determining a first feature set value describing a first set of values of one or more features of the first version of the content piece;
        determining, based on the first feature set value, using a mapping, a first maturity score of the first version of the content piece;
        detecting that a second user is editing a second version of the content piece in parallel with the first user editing the first version of the content piece;
        determining a second feature set value describing a second set of values of the one or more features of the second version of the content piece;
        determining, based on the second feature set value, using the mapping, a second maturity score of the second version of the content piece;
        detecting that the second maturity score meets a maturity threshold;
        performing a remedial action, based at least in part on the second maturity score reaching the maturity threshold, and based at least in part on the second user editing the second version of the content piece in parallel with the first user editing the first version of the content piece;
        associating a respective color with each possible maturity score, wherein the first maturity score is associated with a first color; and
        tagging the first version of the content piece with the first color to indicate the first maturity score to the first user.

8. The system of claim 7, wherein the remedial action comprises:
    merging the first version of the content piece with the second version of the content piece;

wherein the merging creates a conflict, and wherein the second version of the content piece wins the conflict based on the second maturity score meeting the maturity threshold.

9. The system of claim 7, wherein the remedial action comprises automatically opening a communication channel between the first user and the second user.

10. The system of claim 7, wherein the maturity threshold varies between users, and wherein a respective maturity threshold of the second user is based on an experience level of the second user.

11. The system of claim 7, the computer-readable instructions further comprising:
    learning the mapping based on training data, wherein the training data comprises a plurality of content pieces and a plurality of maturity scores, and wherein each content piece is associated with a respective maturity score in the training data.

12. The system of claim 7, the computer-readable instructions further comprising updating the first maturity score and the second maturity score in real time as the first version of the content piece and the second version of the content piece are edited.

13. A computer-program product for dynamic code maturity determination, the computer-program product comprising a computer-readable storage medium having program instructions embodied therewith, the program instructions executable by a processor to cause the processor to perform a method comprising:
    detecting that a first user is editing a first version of a content piece;
    determining a first feature set value describing a first set of values of one or more features of the first version of the content piece;
    determining, based on the first feature set value, using a mapping, a first maturity score of the first version of the content piece;
    detecting that a second user is editing a second version of the content piece in parallel with the first user editing the first version of the content piece;
    determining a second feature set value describing a second set of values of the one or more features of the second version of the content piece;
    determining, based on the second feature set value, using the mapping, a second maturity score of the second version of the content piece;
    detecting that the second maturity score meets a maturity threshold;
    performing a remedial action, based at least in part on the second maturity score reaching the maturity threshold, and based at least in part on the second user editing the second version of the content piece in parallel with the first user editing the first version of the content piece;
    associating a respective color with each possible maturity score, wherein the first maturity score is associated with a first color; and
    tagging the first version of the content piece with the first color to indicate the first maturity score to the first user.

14. The computer-program product of claim 13, wherein the remedial action comprises:
    merging the first version of the content piece with the second version of the content piece;
    wherein the merging creates a conflict, and wherein the second version of the content piece wins the conflict based on the second maturity score meeting the maturity threshold.

15. The computer-program product of claim 13, wherein the remedial action comprises automatically opening a communication channel between the first user and the second user.

16. The computer-program product of claim 13, wherein the maturity threshold varies between users, and wherein a respective maturity threshold of the second user is based on an experience level of the second user.

17. The computer-program product of claim 13, the method further comprising:
    learning the mapping based on training data, wherein the training data comprises a plurality of content pieces and a plurality of maturity scores, and wherein each content piece is associated with a respective maturity score in the training data.

* * * * *